United States Patent [19]

Broberg

[11] Patent Number: 5,236,232
[45] Date of Patent: Aug. 17, 1993

[54] KNOT TYPING DEVICE AND METHOD

[75] Inventor: James E. Broberg, Crystal Lake, Ill.

[73] Assignee: Du-Bro Products, Inc., Wauconda, Ill.

[21] Appl. No.: 921,929

[22] Filed: Jul. 29, 1992

[51] Int. Cl.⁵ .................... B65H 69/04; D03J 3/00
[52] U.S. Cl. ............................... 289/1.5; 289/17
[58] Field of Search .............. 289/1.2, 1.5, 2, 17, 289/18.1

[56] References Cited

U.S. PATENT DOCUMENTS

| | | | |
|---|---|---|---|
| 2,899,226 | 8/1959 | Lint | 289/17 |
| 3,169,787 | 2/1965 | Zolezzi | 289/17 |
| 4,525,003 | 6/1985 | Tate, Jr. | 289/17 |
| 4,870,772 | 10/1989 | Johns | 289/17 |

Primary Examiner—Clifford D. Crowder
Assistant Examiner—Michael A. Neas
Attorney, Agent, or Firm—Niro, Scavone, Haller & Niro

[57] ABSTRACT

A knot tying device that permits the formation of slip bobber knots for use with slip bobbers or floats for fishing. The device includes a cylindrical knot support member with two bores. A first bore extends through the length of the support member while a second bore extends from the top surface of the knot support member substantially parallel to the first bore and out through a thumb slot present in the side wall of the support knot member. A carrier tube is inserted into the first bore of the support member. The string is wrapped about the device to form a knot on the carrier which is later transferred to the desired portion of the fishing line.

13 Claims, 2 Drawing Sheets

KNOT TYPING DEVICE AND METHOD

BACKGROUND OF THE INVENTION

The present invention is relates generally to a knot tying device. More specifically, the present invention relates to a device that assists the tying of knots for use on a fishing line to restrict the movement of slip bobbers thereon.

In the sport of fishing, it has been well known to employ a bobber on a length of line to be cast into the water. Typically, the bobber is an airtight hollow structure capable of floating on the surface of the water. Securement of the bobber on the fishing line a predetermined distance from the hook enables the fisherman to ensure that the hook, which is not capable of floating, drops below the surface of the approximate distance between the hook and the bobber. As a result, the hook can be positioned in the precise desired location below the surface of the water.

To provide flexibility of the positioning of bobbers along the fishing line, slip bobbers or floats are employed. These devices have passageways through which the fishing line may pass. The slip bobbers are permitted to slide along the fishing line. It is desirous to allow the slip bobber to slide almost to the hook during casting yet slide to a predetermined distance away from the hook during the fishing operation. On the fishing line, various means are employed for restricting the ability of the slip bobber to slide along the fishing line. Typically, a split shot weight is provided on the fishing line to prevent the slip bobber from sliding to close to the hook while a slip bobber or float knot is provided on the fishing line to ensure that the slip bobber does not slide to far away from the hook. The split shot weight and slip bobber knot are affixed to the fishing line and are of a size larger than the passageway through the slip bobber. As a result, a fisherman may have complete control of the range of movement of the slip bobber on the fishing line.

The slip bobber knot is usually manufactured of a resilient nylon based material that is wound 4-10 times depending on the application and requirements of the user. For the knot to be effective in restricting the slip bobber from sliding along the line, it must be tightly made so as to firmly grip the fishing line so it cannot slide along the line. If a poor knot is used, the possibility that the slip bobber will move the knot will be increased enabling the slip bobber to slide further away from the hook than originally intended.

Due to the demand of slip bobber knots and their difficulty of formation by hand, a number of manufacturers sell pre-made slip bobber knots that may be transferred onto an existing fishing line. However, such pre-made knots are expensive. Therefore, it is desirous for a fisherman to be able to quickly and easily form slip bobber knots to his or her personal requirements and to avoid the cost of pre-made knots.

SUMMARY OF THE INVENTION

The present invention preserves the advantages of the prior art knot tying devices. In addition, it provides new advantages not found in currently available knot tying devices, and overcomes many of the disadvantages of such currently available devices.

The invention is generally directed to a novel and unique knot tying device with particular application in tying slip bobber knots for fishing lines. The tying device of the present invention enables the simple and easy formation of slip bobber knots. The preferred embodiment of the present invention includes two primary members. A substantially cylindrical knot support member is provided into which a tubular member is inserted.

The cylindrical knot support member is of a generally cylindrical configuration with a thumb slot provided in its side wall. The top of the cylinder is generally closed while the lower end is open. A first bore is present through the entire length of the support member and a second bore extends parallel to the first bore from the top of the knot support member and exiting at an upper portion of the thumb slot. The second bore does not exit at the open bottom of the cylinder. The two bores are independent from one another and do not intersect.

The second bore extends above the top surface of the cylinder into a projection having a radially extending flange thereon. Inserted into the projection is a metal, preferably brass, tube which provides an even further extension of the second bore. The tube extension of the second bore may be manufactured of another material, such as plastic. Alternatively, the tube extension may be integrally formed with the flanged projection.

The invention further includes a knot carrier tube or rod that slidably engages within the first bore. The carrier is preferably a plastic tubular member but may be manufactured of other materials and may also be rodular in shape. The diameter of the first bore is preferably substantially the same as the outer diameter of the carrier tube to create a loose friction fit. The carrier tube further includes a slit in its top surface for engagement with a length of slip bobber knot string material. Other means for securing the string to the uppermost portion of the carrier tube may be employed, such as clips or adhesives.

In operation, the user secures a length of slip bobber string at one of its ends into the slip in the top portion of the carrier tube. The carrier tube is then inserted into the first bore from the top of the cylindrical knot support leaving approximately 1-2 inches of straw above. The long end of knot string is secured at a second point between the side wall of the carrier tube and the side wall of the projection of the second bore. The flange of the projection maintains the string at this second point. The long end of the string is then pulled to create a tight length of string between the top of carrier member and the projection of the second bore. The string is then wrapped clockwise around both the carrier tube and the extension of the second bore a number of times according to the size of the know desired. The long end of the string is inserted into the extension member, through the projection and through the second bore to exit out though the thumb slot. With the long end of the string held tight, the wrapped string may be transferred to the carrier tube by removing the carrier tube from the first bore. By pulling on the respective loose ends of the resultant knot, it will become tight. The knot may now be again transferred to the fishing line for positioning.

It is therefore an object of the present invention to provide a knot tying device that may be operated simply and easily.

Another object of the present invention is to provide a knot tying device that facilitates the formation of slip bobber knots.

It is further object of the present invention to provide a knot tying device that enables the formation of custom sized knots.

It is yet a further object of the present invention to provide a knot tying device that enables the formation of various sized slip bobber knots for use with slip bobber or slip float equipment.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
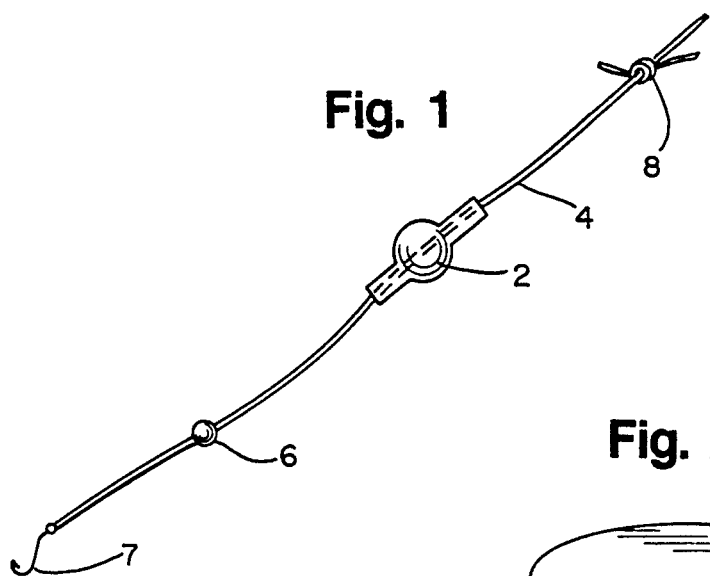
FIG. 1 is a perspective view of a slip bobber system employing a slip bobber knot.

Referring to FIG. 1, a slip bobber system is generally shown to include a slip bobber or float 2 slidably engaged over fishing line 4. A split shot weight 6 is connected to fishing line 4 at a position between the slip bobber 2 and hook 7 which is connected to the free end of the fishing line 4. A slip bobber knot is situated on fishing line 4 at a position between slip bobber 2 and a fishing rod (not shown). The split shot weight 6 prevents the slip bobber from sliding too close to the hook 7 while the slip bobber knot prevents the bobber from sliding too far away from the hook 7.

Figure 2:
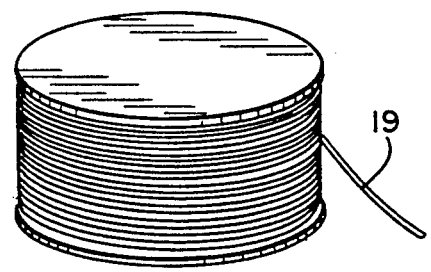
FIG. 2 is a perspective view of a spool of slip bobber knot string material.

During casting of the fishing rod, the slip bobber 2 will slide toward hook 7 and be in contact with split shot weight 6. When the line 4 strikes the water and comes to a resting position, slip bobber 2 will remain on the surface of the water due to its floating characteristics while hook 7 pulls line 4 downward into the water until slip bobber knot 8 contacts slip bobber 2. Since the location of the slip bobber knot is adjustable, the depth of the hook 7 in the water may be easily adjusted as well. As shown in FIG. 2, knot 8 is preferably manufactured of a string-like material appropriate for the tying of slip bobber knots. The present invention addresses the formation of such slip bobber knots.

Figure 3:
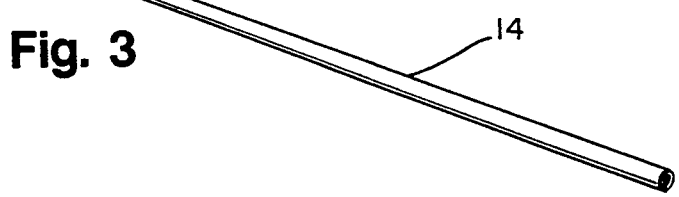
FIG. 3 is a perspective view of a carrier tube of the present invention.
Figure 4:
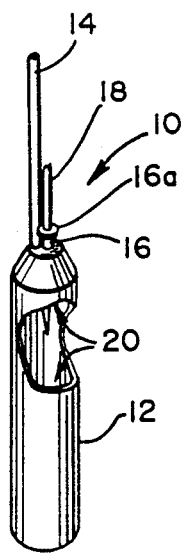
FIG. 4 is a perspective view of the cylindrical knot support member of the present invention with the carrier tube of FIG. 3 inserted therein.
Figure 5:
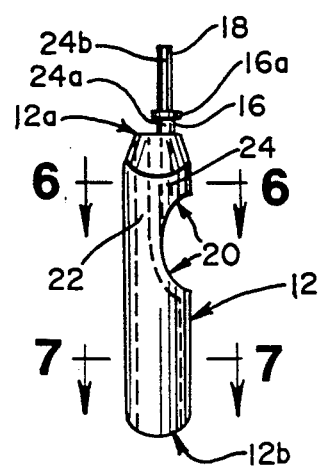
FIG. 5 is a side view of the knot support member shown in FIG. 4.

In FIG. 3, a carrier tube member 14 of the present invention is shown. Carrier tube 14 is a relatively long tubular member that is preferably manufactured of plastic. Other similar materials may be employed to manufacture the carrier member 14. Alternatively, carrier tube 14 may be cylindrical in shape as opposed to tubular. FIG. 4 is a perspective view of the complete device of the present invention with carrier tube inserted into a bore of knot support member 12. Referring to FIGS. 4 and 5, knot support 12 is preferably cylindrical in shape but may be manufactured in other configurations. A first bore 22 is provided from the top surface 12a of knot support 12 through a length of knot support 12 preferably parallel to the axis of cylindrical knot support 12. Bore 22 extends down through knot support 12 into a lower bore 23. A second bore 24 also extends from the top of knot support 12 through the body of the knot support 12 and exits at thumb slot 20. Second bore 24 is preferably parallel to first bore 22.

Figure 6:
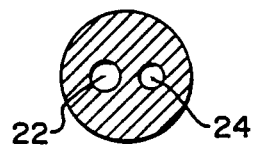
FIG. 6 is a cross-sectional view of the knot support member through the line A—A.
Figure 7:
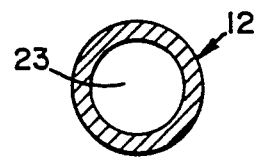
FIG. 7 is a cross-sectional view of the knot support member through the line B—B.

The inner structure of the knot support 12 is further illustrated in FIGS. 6 and 7. FIG. 6 shows a cross-section of the knot support 12 through line A—A. The diameter of first bore 22 is shown to be slightly larger than second bore 24, however, these relative dimensions may be varied. In FIG. 7, the cross-section of knot support 12 through line B—B is shown. It should be appreciated that lower bore 23 is an extension of first bore 22. Such a structure is preferred for ease of manufacture. Alternatively, first bore 22 may extend from top edge 12a to completely through open end 12b.

First bore 22 has a diameter such that a loose friction fit can be realized with the carrier tube when it inserted therein. The carrier tube 14 resides within first bore 22 during the formation of a knot in accordance with the present invention.

Referring to FIG. 5, projection 16 is provided on surface 12a of the knot support 12. Projection 16 is preferably cylindrical and integrally formed with the body of knot support 12. Projection 16 also has a bore 24a that is of the same diameter as second bore 24. A tubular wrap extension 18 is provided on projection 16. Wrap extension may also be integrally formed of the same material as the projection 16 and knot support 12, however, it is preferred that it be formed of metal, such as brass, and permanently inserted into projection 16.

Figure 8A:
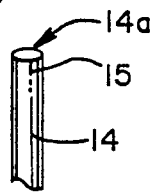
FIGS. 8A through 8H are perspective views illustrating the operation of the knot tying device of the present invention.
Figure 8B:
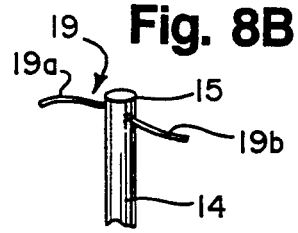
Figure 8C:
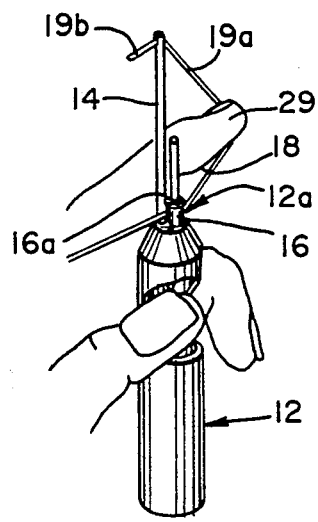

The operation of the knot tying device of the present invention is described below in conjunction with FIGS. 8A through 8H. FIG. 8A shows a perspective view of the carrier tube 14 with slit 15 cut into top surface 14a. Slit 15 may be pre-cut into the carrier tube 14 or may be cut by the user of the invention. In FIG. 8B, a length of slip bobber string material 19 is placed into slit 15. It is preferable that string 19 be secured in slit 15 in carrier tube 14 to have a longer length 19a and a shorter length 19b. Slit 15 is used to assist the user in positioning the string 19. However, slit 15 may be omitted in operation.

Once string 19a is secured into carrier tube 14, the opposing end of carrier tube (not shown) is inserted into the first bore 22, as seen in FIGS. 5 through 6, so that the end with string attached is approximately 1 or two inches from top surface 12a. The knot support 12 is then placed in the left hand of the user. The longer length string 19a is positioned over the tip of index finger 29 and snapped between carrier tube 14 and projection 16. Flange 16a maintains string 19a between carrier tube and projection 16. The loose end of string 19a is gently pulled to tighten the length of string present between slit 15 and projection 16.

Figure 8D:
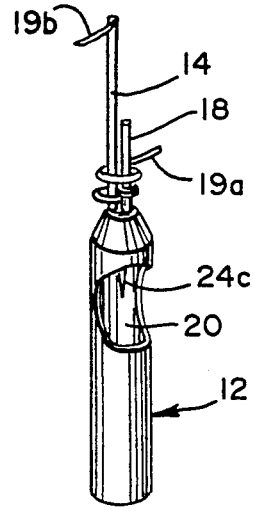
Figure 8E:
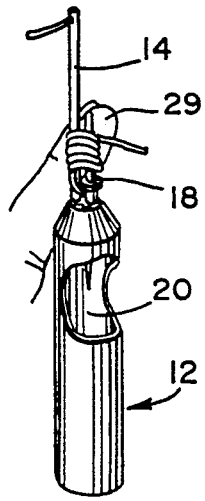
Figure 8F:
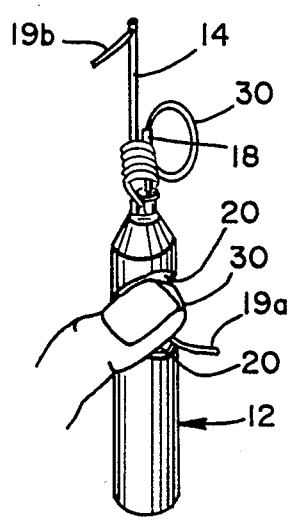

In FIG. 8D, the winding of a knot is shown. String 19a is wrapped around both the tubular wrap extension 18 as well as the carrier tube 14 as many times as desired. Typically, four to six times is sufficient to create a desirable slip bobber knot. As shown in FIGS. 8 and 8F, the knot is secured by index finger 29 while the loose end of longer length string 19a is inserted into the top open end of tubular wrap extension 18 so it may exit out the lower opening of bore 24. The loose end of string 19a is pulled through open end 24a until the knot is tight.

Figure 8G:
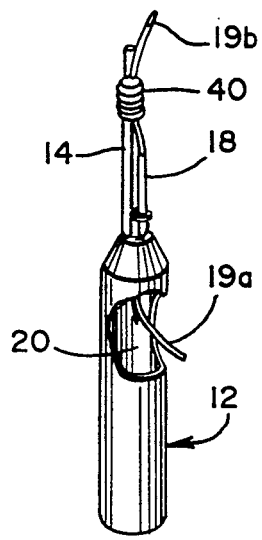
Figure 8H:
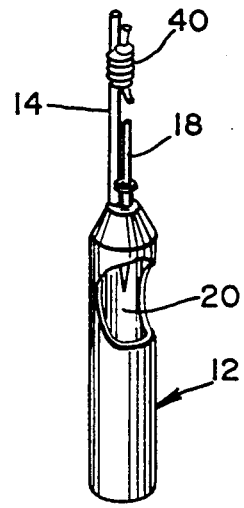

The string 19a, as seen in FIG. 8F is held in place by thumb 30 in the thumb slot 20. In FIG. 8G, the carrier tube 14 is removed from within first bore 22 with knot 40 wrapped thereon. String length 19a may be removed from within tubular wrap extension 18. As shown in FIG. 8H, Both the longer and shorter string lengths 19a and 19b are trimmed for neatness and compactness. Once knot 40 has been completed, it may be then transferred to a fishing line 4 for use in a slip bobber system as shown in FIG. 1.

It should be understood that the knot tying device of the present invention is preferably used for tying slip bobber knots for use in slip bobber systems. However, the knot tying device may also be scaled larger or smaller for use in other application. Overall, the present invention permits the user to simply and easily form a sliding knot having particular application in slip bobber knots.

It will be appreciated by those skilled in the art that various changes and modifications can be made to the illustrated embodiments without departing from the spirit of the present invention. All such modifications and changes are intended to be covered by the appended claims.

What is claimed is:

1. A device for forming a length of string material into a knot, comprising:
    a knot support member having an upper surface;
    a first bore disposed longitudinally through said knot support member extending down from said upper surface;
    a second bore disposed longitudinally through said knot support member extending down from said upper surface defining an input port of said second bore; said second bore terminating at an exit port, and being independent of said first bore, and being capable of passing string through said input port, through said second bore and out said exit port;
    a projection disposed on said upper surface and having a bore substantially aligned with said second bore;
    a tubular wrap extension member disposed in said projection and having a bore substantially aligned with said projection; and
    a cylindrical carrier member slidably engaged with said first bore.

2. The device of claim 1, wherein said projection includes a flange radially disposed about its outer wall.

3. The device of claim 1, wherein said cylindrical carrier member is tubular.

4. The device of claim 1, wherein said tubular wrap extension is manufactured of brass.

5. The device of claim 1, wherein said knot support member includes a notch in its side wall; said exit port being disposed in said notch.

6. A method of forming a knot from a length of knot string material having first and second ends, comprising the steps of:
    slidably engaging a carrier member within a bore of a knot support member;
    securing a middle portion of said knot string material between a tubular member disposed on said knot support member and said carrier member;
    winding said knot string material around said carrier member and said tubular member a plurality of times;
    inserting said second end into said tubular member and exiting out an orifice of said knot support member;
    removing said carrier member with said wound string material thereon to form a knot while said second end is secured to said knot support member.

7. The method of claim 6, further comprising the step of:
    trimming excess string on opposing sides of said knot.

8. The method of claim 6, wherein said carrier member is tubular.

9. The method of claim 6, wherein said carrier member is cylindrical.

10. The method of claim 6, wherein said knot support member includes a notch for securing said string during removal of said carrier member.

11. The method of claim 6, further comprising the step of:
    cutting a slit in said first end of said carrier member for receiving said first end of said string.

12. The method of claim 6, wherein said tubular member is manufactured of brass.

13. The method of claim 6, further comprising the step of:
    pulling said second end of said string to tighten said string prior to removing said carrier member.

* * * * *